No. 655,995. Patented Aug. 14, 1900.
S. B. & J. F. RITTENHOUSE.
MOLE TRAP.
(Application filed Jan. 22, 1900.)
(No Model.)
Fig. 1
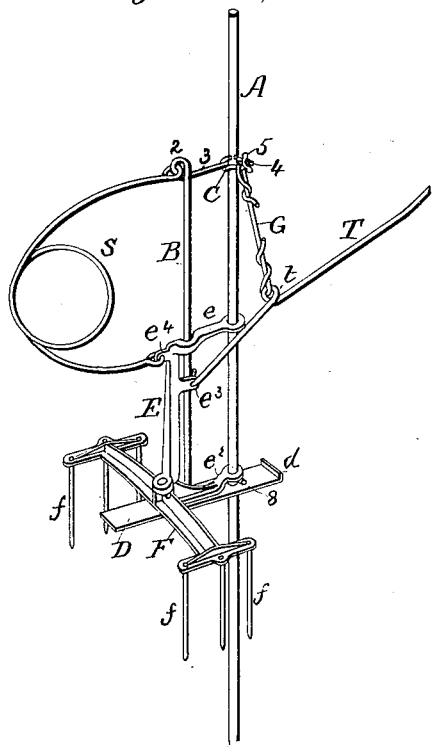
Fig. 2
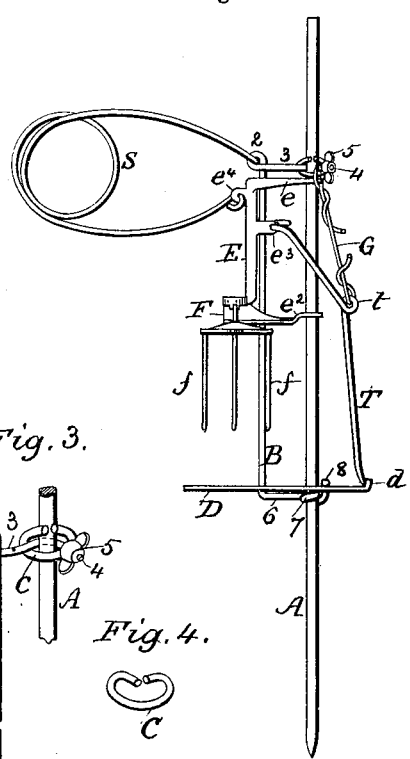
Fig. 3
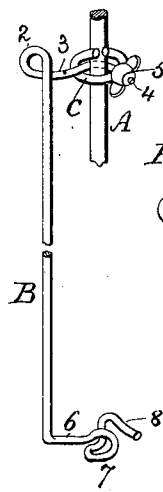
Fig. 4
WITNESSES
E. W. Hart
J. J. Masson
INVENTORS
Silas B. Rittenhouse
and J Freeman Rittenhouse
by E. E. Masson, Attorney
THE NORRIS PETERS CO., PHOTO-LITHO., WASHINGTON, D. C.

UNITED STATES PATENT OFFICE.

SILAS B. RITTENHOUSE AND JAMES FREEMAN RITTENHOUSE, OF LIBERTY MILLS, INDIANA.

MOLE-TRAP.

SPECIFICATION forming part of Letters Patent No. 655,295, dated August 14, 1900.

Application filed January 22, 1900. Serial No. 2,327. (No model.)

*To all whom it may concern:*

Be it known that we, SILAS B. RITTENHOUSE and JAMES FREEMAN RITTENHOUSE, citizens of the United States, residing at Liberty Mills, in the county of Wabash and State of Indiana, have invented certain new and useful Improvements in Mole-Traps, of which the following is a specification, reference being had therein to the accompanying drawings.

This invention relates to impalement-traps the prongs of which are intended to pierce and kill moles or other small animals, said prongs being carried by a suitable frame adapted to slide and be spring-propelled down along an anchoring vertical guide-rod, which is thrust into the ground alongside of the burrow of the mole; and the objects of our invention are to have the body of the trap adjustable upon the anchoring guide-rod to suit the nature of the ground on which the trap is to be used, whether the soil is soft, or hard and dense, or stony.

Other objects in the peculiar construction of the trap will be hereinafter described in connection with the drawings, in which—

Figure 1 is a perspective view of the trap unset with the prongs-frame resting upon the tripping-plate. Fig. 2 is a side view of the trap set, having the prongs-frame elevated and the trigger in engagement with the tripping-plate. Fig. 3 is a perspective view, on a larger scale, of a portion of the vertical anchor-rod and a portion of the stationary parts of the trap adjustably clamped and secured to said rod. Fig. 4 is a perspective view of the link used as a part of the frame-fastenings.

In said drawings, A represents a rod of iron or of other metal or material, preferably cylindrical and pointed at its lower end, to be driven part way in the ground and used as an anchor for the trap, and also as a guideway for the vertically-sliding parts thereof.

B represents a light rod or stout wire constituting a part of the body of the trap. The main portion of the rod B is straight and mounted parallel with the anchor-rod A; but the upper end of said rod B has a loop 2 bent away from the rod A to provide the upper bearing of the operating-spring S. From the loop 2 the rod B is bent at a right angle to its body to constitute an arm 3, which is extended to and part way around the rod A, its end 4 being substantially at a right angle to the arm 3 and screw-threaded, upon which is placed a thumb-nut 5. The bend between the portions 3 and 4 of the rod B clasps one side of the rod A; but to clasp the other side an elongated and angularly-bent link C is used, and when in position, as clearly shown in Fig. 3, the thumb-nut 5 bears against it and, in connection with said link, adjustably clamps the rod A. The lower end of the rod B is also bent at a right angle to its body to constitute an arm 6, which has its outer portion bent to form a loop 7, adapted to encircle the rod A and to form a pivotal support for the tripping-plate D. From the loop 7 the arm 6 is bent a short distance upwardly and again horizontally to provide an arm 8 to rest over the plate D and prevent said plate from being bodily lifted away from its normal position on its pivotal support 7. Both rods A and B pass loosely through perforations in the tripping-plate D, the shortest end of which is provided with a turned-up lip $d$ to engage with the outer end of the trigger T.

The rod A is used as a guide for the vertically-sliding frame of the trap. This frame is preferably of cast metal and approximately in the form of a capital-letter E, having a standard E, provided with a horizontal arm $e$ at the top and a horizontal arm $e^2$ at the bottom, each arm $e$ and $e^2$ having at its end an eye loosely encircling the rod A. To the lower end of the standard E is secured in a horizontal position an I-shaped beam F of small size, each end of which is provided with a row of prongs $f$, intended to pierce and kill any mole which may while lifting the top of its burrow slightly lift the outer end of the tripping-plate D and release the trigger T. Said trigger has its inner end pivoted to a lug $e^3$, projecting from the inner side of the frame E, between its arms $e$ and $e^2$. The trigger T is looped or provided with an eye $t$ about halfway of its length, from which it is suspended by means of a short length of wire G, having one end interlocked with said eye $t$ and the other end interlocked with the link C. The upper end of the standard E has also a perforated lug $e^4$, which receives the lower end of the bent and looped spring S, which propels the prongs-carrying frame.

Having now fully described our invention, we claim—

1. In combination with the vertical anchoring-rod of a mole-trap, the body-rod of the trap adjustably clamped upon said rod substantially as described.

2. The combination of the vertical anchoring-rod of a trap with the vertical rod B, of the body of trap having its lower end encircling the anchoring-rod and its upper end bent to one side of said anchoring-rod and adjustably secured thereon, a thumb-nut on said upper end, and a link embracing both rods and supporting the thumb-nut substantially as described.

3. The combination of the vertical anchoring-rod of a trap having the vertical rod B, provided at the top with the eye 2, and side arm 3, and at the bottom with the side arm 6, the loop 7, and lateral arm 8, the tripping-plate resting upon the loop 7, and under the arm 8, the prongs-carrying frame and a trigger pivoted at one end to said frame substantially as described.

In testimony whereof we affix our signatures in presence of two witnesses.

SILAS B. RITTENHOUSE.
J. FREEMAN RITTENHOUSE.

Witnesses:
J. L. HULL,
G. HURLEY.